Jan. 28, 1964   H. C. HARTUNG   3,119,406
CAM OPERATED CONTROLLING VALVE
Filed June 16, 1961   3 Sheets-Sheet 1

INVENTOR.
HOMER C. HARTUNG
BY
Alfred R. Fuchs
ATTORNEY

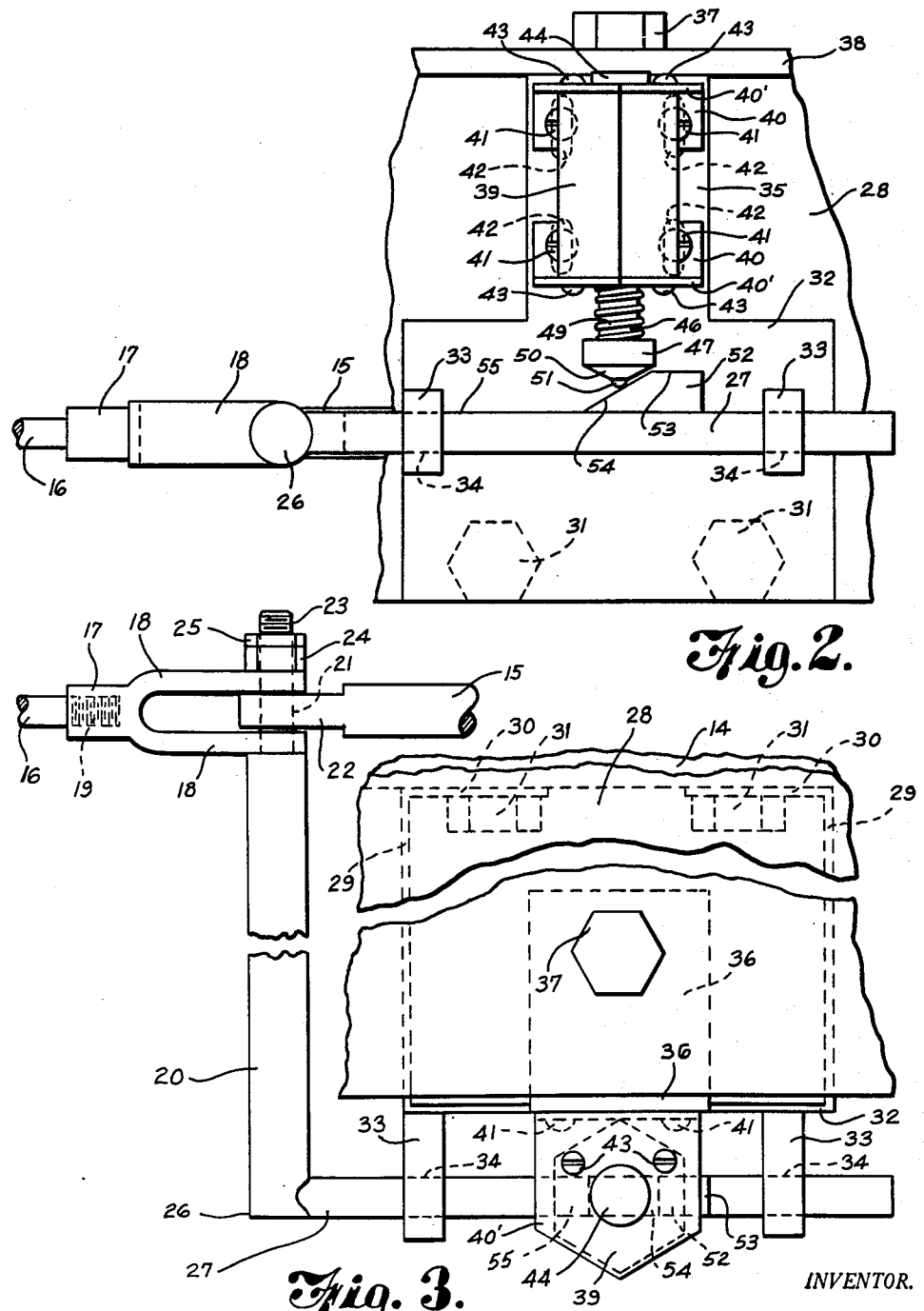

INVENTOR.
HOMER C. HARTUNG
BY
Alfred R. Fuchs
ATTORNEY

United States Patent Office 3,119,406
Patented Jan. 28, 1964

3,119,406
CAM OPERATED CONTROLLING VALVE
Homer C. Hartung, Claycomo, Mo., assignor, by mesne assignments, to Columbian Steel Tank Company, Kansas City, Mo., a corporation of Delaware
Filed June 16, 1961, Ser. No. 117,705
12 Claims. (Cl. 137—351)

My invention relates to controlling means for apparatus for transporting a fluid, and more particularly to a cam operated controlling valve for compressed air supply for controlling the operation of certain apparatus associated with the transporting vehicle to assure the safe operation thereof.

In the transportation of inflammable fluids, such as are transported by refueling apparatus for airplanes, in order to assure of the safe operation thereof, means is provided for controlling the operation of the vehicle brakes and other apparatus, such as the engine throttle and emergency valves associated with the tank or tank compartments, that are provided on the vehicle, so that the brake of the vehicle can not be released until the pump for pumping the inflammable fluid has been put entirely out of operation and so that the emergency valves provided for preventing discharge of inflammable fluid from the tank or the compartments thereof are closed when operation of said pump is stopped. For the same purpose means is also provided for preventing the opening of the throttle of the engine that drives the pump more than a certain amount that assures of the safe operation of the pump, this being accomplished by means of a throttle stop that is provided for the throttle operator, which is provided with controlling means that keeps the throttle stop in its stop position as long as the pump is operating and provides for the movement of the throttle stop out of its stop position so as to permit normal operation of the throttle for driving the transporting vehicle only after the pump has been put completely out of operation.

In order to have such control over the brakes, the throttle stop and the emergency valves, compressed air is supplied from a supply tank to the brakes to apply the brakes of the vehicle when the pump is in operation, thus making it impossible for the operator of the vehicle to release the brake by means of the usual brake pedal; compressed air is supplied from the supply tank to the emergency valves to open the same, so that fuel can flow from the vehicle tank to the wing tanks of the airplane only when the pump is thrown into operation; and in order to prevent the pump from being operated too rapidly, a stop is provided for the throttle mechanism, to prevent opening of the throttle beyond a certain predetermined point.

In order to maintain this control of the brakes, emergency valves and throttle stop, a controlling element, for controlling the supply of compressed air to the brakes, the emergency valves and the throttle stop, is provided in the form of a valve, the position of which is controlled by the position of the pump operating means, which is in the form of a shift rod, which operates longitudinally of itself between one extreme position, in which the pump is thrown into operation, and another extreme position, in which the pump is thrown completely out of operation, and which moves through a neutral zone between the two extreme positions in which the pump is either being thrown into operation or thrown out of operation, dependent upon the direction of movement of the shift rod.

More specifically, my invention comprises means for controlling the operation of a pump, in apparatus for transporting a fluid, comprising a shift rod, a compressed air operated throttle stop, a compressed air operated emergency valve, a brake line and a valve controlling supply of compressed air to the brake line, throttle stop operating means and emergency valve operating means, and means movable with the shift rod controlling the position of the controlling valve.

Still more specifically, my invention comprises such a pump controlling means comprising a shift rod movable between a pump operating position and a pump inoperative position through a neutral zone, and a cam movable with the shift rod controlling the position of the aforementioned controlling valve, the cam having a high portion, a low portion and a gradually inclined portion connecting the low and high portions, which inclined portion is engaged by a follower controlling the position of the valve during the movement of the shift rod through the neutral zone.

Other objects and advantages of my invention will appear as the description of the drawings proceeds. I desire to have it understood, however, that I do not intend to limit myself to the particular details shown or described except as defined in the claims.

In the drawings:

FIG. 2 is a fragmentary side elevational view of the pump, the controlling valve and the operating means therefor, on an enlarged scale.

FIG. 3 is a plan view of the controlling valve operating means and associated parts, partly broken away, on an enlarged scale.

Figure 1:
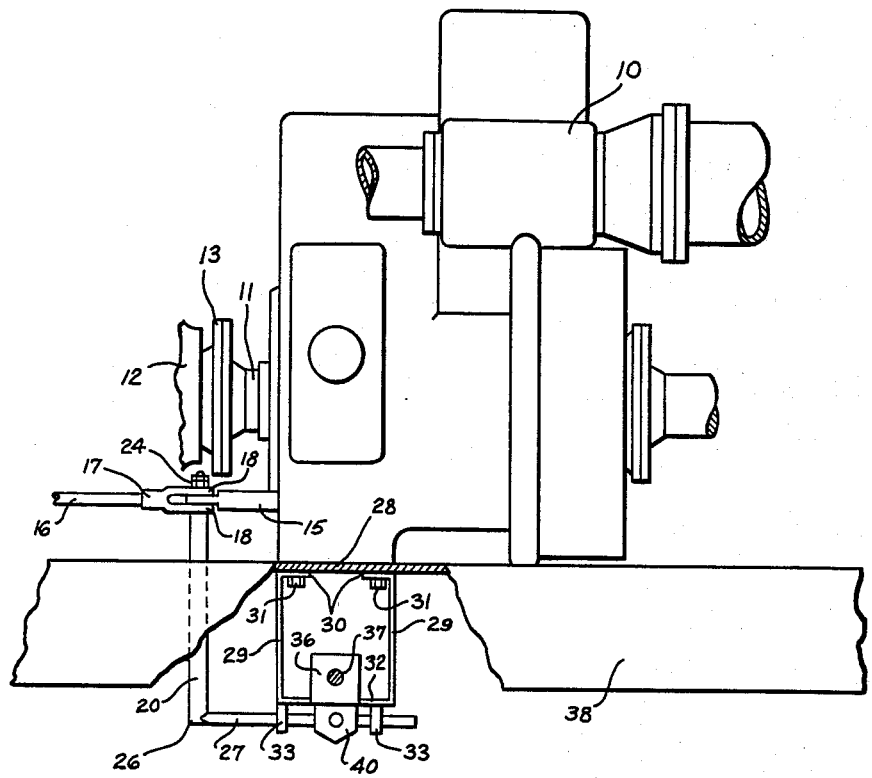
FIG. 1 is a plan view of a fluid pump for a refueling vehicle, the cam operated controlling valve and operating means therefor, partly broken away.

Referring in detail to the drawings, in FIG. 1 is shown a pump 10, which is driven from the shaft 11 rotated by suitable driving means 12 through the coupling 13, the drive from the shaft 11 to the pump 10 being through a gear box 14, which is provided with suitable gearing for either driving the pump from the shaft 11 or disconnecting the pump 10 from said shaft 11, a shift lever 15 being provided for controlling the position of the gears in the gear box 14.

Referring to FIGS. 1 to 3 inclusive, the shift lever 15 is connected with a shift rod 16 by means of a clevis 17, which is provided with a pair of arms 18 having aligning openings therein that are adapted to align with an opening in the shift lever 15 to connect the shift lever 15 with the shift rod 16 so as to move therewith in a manner to be described below, said shift rod 16 being screw-threadedly connected with the clevis 17, as indicated at 19. A transversely extending bar 20 is provided with a reduced portion 21 that extends through the aligning openings in the ears 18 and in the reduced portion 22 of the shift lever 15, said reduced portion 21 being provided with a screw-threaded end 23, the transversely extending bar 20 being clamped to the clevis 17, and thus connected with the shift rod 16 so as to move therewith, by a nut 24 and lock nut 25 engaging the screw-threaded end portion 23 of said member 20.

The transversely extending bar 20 is one arm of an L-shaped member 26, which has an arm 27 that extends at right angles to the portion 20 of said member 26, the arm 27 thus extending parallel to the shift rod 16. The shift rod 16 moves the shift lever 15 between two extreme positions, one to the right of that shown in FIGS. 1, 2 and 3 and one to the left of that shown in FIGS. 1, 2 and 3, through a neutral zone which corresponds to the position of the parts shown in FIGS. 1, 2 and 3. When in the one extreme position, which is that to the left of the position shown in FIGS. 1, 2 and 3, the gears in the gear box 14 connect the shaft 11 with the pump 10 so as to operate the pump. When the parts are in the extreme position to the right of the position shown in FIGS. 1 to 3, then the pump 10 is completely disconnected from the shaft 11. Mounted on a channel member 28 on the vehicle is a bracket that has a pair of arms 29 that have foot portions 30, that are secured to the member 28 by suitable headed screw-threaded members 31. Said bracket has a transverse portion 32 connecting the pair of arms 29 and a pair of guide ears 33 extend from the transverse portion 32 of said bracket having openings 34 therein slidably receiving the arm 27 of the L-shaped member 26. Said transversely extending portion 32 of the bracket also has an upward extension 35, which is provided with a horizontal flange 36, which is secured by means of the bolt 37 to a horizontal flange 38 on the channel 28.

A valve body 39 is provided with a pair of angular members 40 at opposite ends thereof, which are provided with suitable openings in the vertical flanges thereof, through which screw-threaded headed fastening elements 41 extend. Said fastening elements 41 extend through slots 42 in the upstanding portion 35 of the bracket, thus permitting adjustment of the valve body 39 up and down on said bracket, the horizontal flanges 40' of the angular members 40 being secured to the valve body 39 by suitable fastening elements 43.

Figure 5:
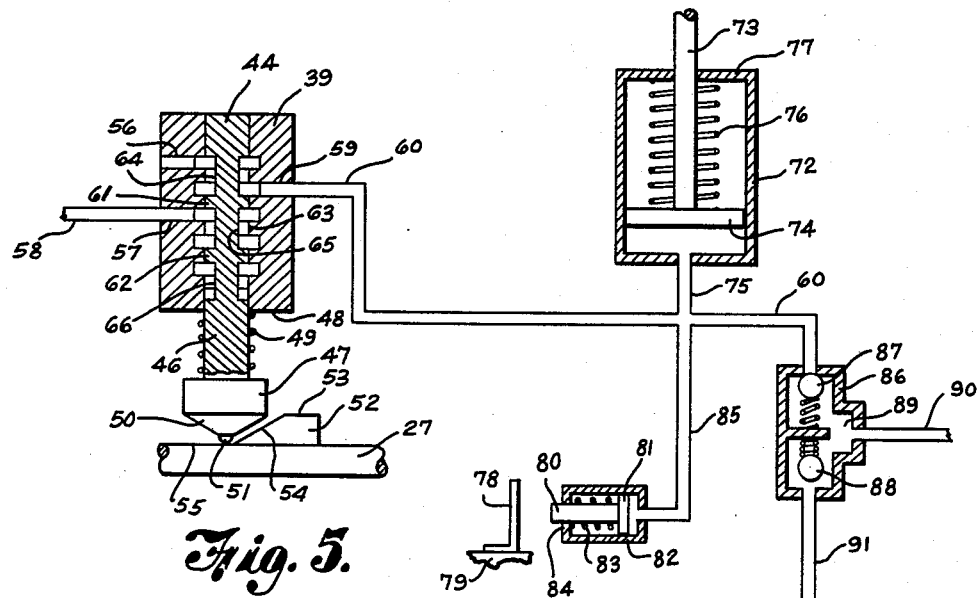
FIG. 5 is a diagrammatic view of the controlling valve, compressed air lines, including a portion of the brake line, and controlling means for an emergency valve and the throttle stop.
Figure 6:
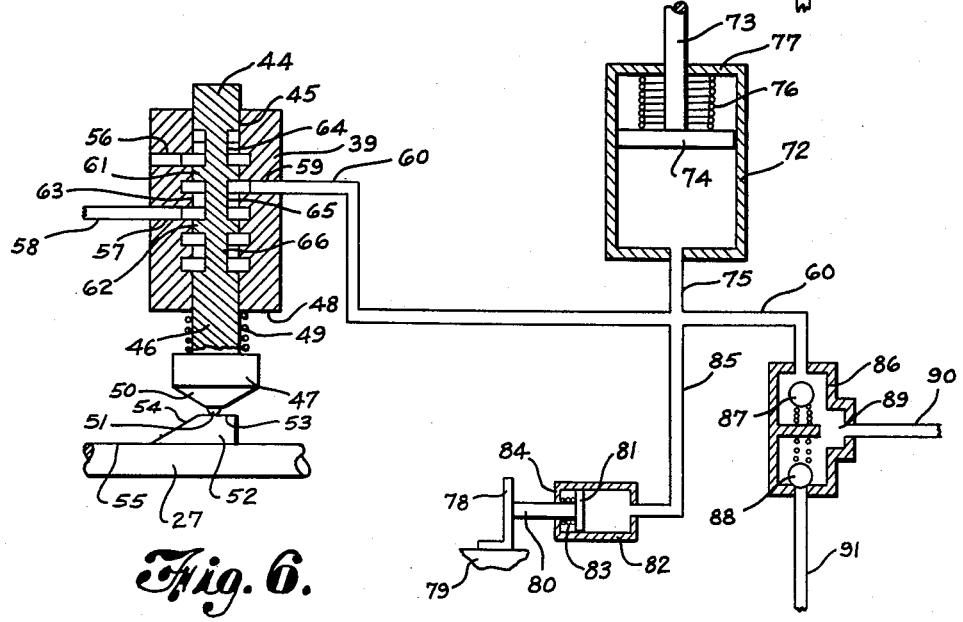
FIG. 6 is a similar view of the same parts in the alternative position thereof.

Referring to FIGS. 5 and 6, mounted in the valve body 39 is a valve member 44, which is slidably mounted in a passage 45 in said valve body, and which has a downward extension 46 thereon, which is provided with a head 47 providing a shoulder between the head and the extension 46, between which and the lower end wall 48 of the valve body 39 is mounted a compression coil spring 49, which tends to move the valve member 44 to the position shown in FIG. 5. The head 47 has a tapering lower portion 50, which terminates in a button-like projection 51. While the coil spring 49 is shown as in engagement with the under side 48 of the valve body 39 in the diagrammatic views, FIGS. 5 and 6, it actually is in engagement with the horizontal flange 40' of the lower angle member 40 as shown in FIG. 2.

Mounted on the arm 27 of the L-shaped member 26 is a cam block 52, which has a flat top face 53 and a planar inclined face 54 extending from the straight top edge 55 of the members 27 to the flat top face 53. The adjustment of the position of the valve body 39 and of the position of the cam block, by adjustment of the screw-threaded connection between the clevis 17 and shift rod 16, is such that when the shift rod 16 has been moved to its extreme right position the arm 27 of the L-shaped member 26 will be in the position shown in FIG. 5, with the cam block 52 to the right of the follower comprising the projection 51 on the head 47 of the valve member 44, at which time the follower 51 will be in engagement with the low portion 55 of the cam, made up of the member 27 and the block 52. This is the position of the shift lever 15 when the pump is completely disconnected from the shaft 11. Upon movement of the arm 27 with the shift rod 16 to the extreme left position thereof, the follower will be in engagement with the flat top face 53 of the cam block 52 as shown in FIG. 6, and in riding up the inclined face 54 of the cam block 52, the valve member 44 will be moving from the position shown in FIG. 5 to that shown in FIG. 6 and the shift lever 15 will be moving through neutral position, the parts being shown in such neutral position of the shift lever 15 in FIG. 2.

The valve body 39 is shown in FIGS. 5 and 6 as being provided with a passage 56 leading from the chamber within the valve body to the atmosphere. Said valve body is also provided with a passage 57 leading to the chamber within the valve body, with which a line 58 from a source of air under pressure is connected, and with a passage 59 with which a conduit 60 is connected, said passage 59 leading from the chamber within the valve body to said conduit 60. Said valve member is provided with enlargements 61 and 62 that have a sliding fluid tight fit, provided in any suitable manner, with the wall 63 of the valve chamber, and reduced portions 64, 65 and 66, which are located between the enlarged end portions of the valve member 44 and the enlarged portions 61 and 62, said enlarged end portions of the valve member also having a fluid tight fit in the passage 45 extending through the valve and forming the valve chamber. In the position of the valve shown in FIG. 5 the conduit 60 is connected with the passage 56 leading to the atmosphere, while in the position of the valve shown in FIG. 6 air under pressure is supplied to the conduit 60 from the conduit 58 through the passages 57 and 59 and the valve chamber.

Figure 4:
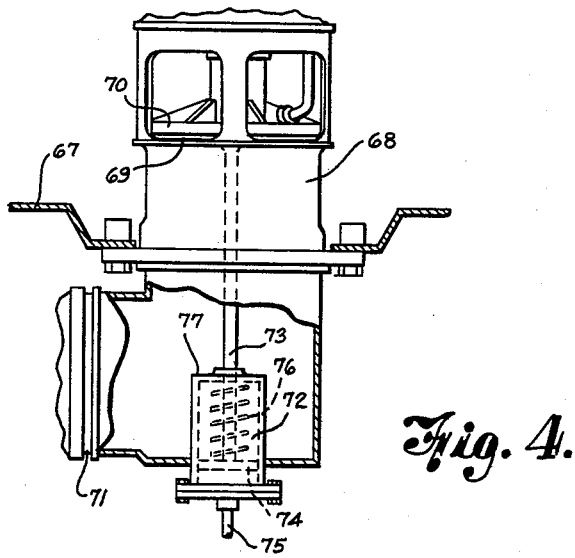
FIG. 4 is a view partly in elevation and partly in section of an emergency valve, a fragmentary portion of the fluid tank being shown in section.

Referring now to FIG. 4, a fragmentary portion of a tank for the fluid that is to be pumped is shown at 67, which is provided with an outlet connection 68, which is provided with a seat 69 with which an emergency valve 70 engages. The outlet connection 68 leads to a manifold 71 and the position of the valve is determined by a controlling member 72, which extends into the outlet connection, said controlling member being provided with a stem 73 connecting the valve 70 with a piston 74 in the controlling member, said controlling member being in the form of an air cylinder mounted in the outlet connection and having a portion thereof extending outwardly from the same. A conduit 75 leads into the cylinder at the end thereof opposite that through which the stem 73 extends and a compression coil spring 76 is mounted between the end wall 77 of the cylinder 72 and the piston 74. The spring 76 normally holds the valve 70 seated so as to prevent discharge of fluid from the tank 67 into the outlet connection. When air under pressure is supplied to the cylinder 72 through the conduit 75 the air under pressure compresses the spring 76 and the valve 70 is lifted from its seat 69.

The emergency valve operating means 72 is shown diagrammatically in FIGS. 5 and 6, the conduit 75 being connected with the conduit 60, as shown in said diagrammatic views. Also in FIGS. 5 and 6 is shown an angular bracket 78 mounted on a movable member 79 that controls the throttle of the engine that drives the vehicle on which the tank is mounted. A throttle stop member 80 is adapted to engage the member 78 to limit movement thereof to the right in FIGS. 5 and 6 so as to limit the opening of the throttle possible through movement of the member 79 to the right. Said throttle stop member 80 is provided with a head 81 that constitutes a piston mounted in the cylinder 82, a compression coil spring 83 being mounted between the piston 81 and the end wall 84 of said cylinder. Air under pressure is supplied to the cylinder 82 through the conduit 85 connected with the conduit 60. When air under pressure is supplied to the cylinder 82 the stop member 80 will be in the position shown in FIG. 6, limiting movement of the throttle operating member, while when in the position shown in FIG. 5, which is that of the parts when no air under pressure is supplied to the cylinder 82 and the spring 83 is effective to move the piston 81 to the position shown in FIG. 5, the stop member 80 is withdrawn so as to not interfere with any desired movements of the throttle operating member 79.

Also connected with the conduit 60 is a double check valve 86, which is provided with spring loaded ball check valves 87 and 88 and a connecting passage 89 leading to the brake line 90. A line 91 also leads to the check valve 86, extending from suitable brake controlling means for manually supplying compressed air to the valve member 86.

With the parts in the position shown in FIG. 6, which is the normal pump operating position, or the position in which the shift rod has moved as far to the left as it can be moved, air under pressure will be supplied to the conduit 60 and to the emergency valve operating cylinder 72 and the throttle stop operating member 82, holding the stop member 80 in its projected position and unseating the emergency valve 70. At the same time the pump will be thrown into operation and air under pressure will be supplied to the brake line 90 so as to apply the brakes of the vehicle so that it can not be moved from the position in which it is at that time located. Upon the completion of the pumping operation, the shift rod is moved to its opposite extreme position, which is that shown diagrammatically in FIG. 5, through the neutral position of the pump gears down the inclined surface 54 of the cam block 52, from the position with the follower 51 on the top level surface 53 thereof to the low portion 55 of the cam on the arm 27 of the L-shaped lever 26, whereupon the valve 44 will move to the position shown in FIG. 5, breaking the connection between the compressed air supply pipe 58 and the conduit 60 and opening the conduit 60 to the atmosphere through the passage 56, whereupon the parts will assume the position shown in FIG. 5, the spring 76 seating the emergency valve 70, the spring 83 withdrawing the throttle stop and the check valve 87 closing. Air under pressure can then be supplied by the usual manual operation of the brake controlling means to the brake line to apply the brakes as desired by the driver of the vehicle, the valve 88 being in the position it would assume when compressed air is supplied from the conduit 91 to apply the brakes by supplying said air to the brake line 90 in FIG. 5.

What I claim is:

1. In apparatus for transporting a fluid, a fluid pump, means controlling the operation of said pump comprising a shift rod movable longitudinally of itself between a pump operating position and a pump inoperative position through a neutral zone, a brake controlling element having a brake-on position and a brake-off position, a cam controlling the position of said brake controlling element, means rigidly connecting said cam and shift rod to move as a unit in parallel paths and a follower on said element engaging said cam to determine the position of said controlling element, said controlling element being in one of said positions during engagement of said follower with the low portion of said cam and in the other of said positions during engagement of said follower with the high portion of said cam, said cam having a gradually inclined portion connecting said low and high portions engaged by said follower during movement of said shift rod through said neutral zone.

2. In apparatus for transporting a fluid, a fluid pump, means controlling the operation of said pump comprising a shift rod movable longitudinally of itself between a pump operating position and a pump inoperative position through a neutral zone, a compressed air operated throttle stop, a compressed air operated emergency valve, a brake line, a valve controlling supply of compressed air to said brake line, throttle stop operating means and emergency valve operating means, said controlling valve having a position to supply compressed air to said brake line, throttle stop and emergency valve operating means and a position to discharge compressed air from said brake line, throttle stop and emergency valve to the atmosphere, a cam, means rigidly connecting said cam to said shift rod to move as a unit therewith in a path parallel thereto, and a follower mounted on said controlling valve engaging said cam to determine the position of said controlling valve, said controlling valve being in one of said positions during engagement of said follower with the low portion of said cam and in the other of said positions during engagement of said follower with the high portion of said cam, said cam having a gradually inclined portion connecting said low and high portions engaged by said follower during movement of said shift rod through said neutral zone.

3. In apparatus for transporting a fluid, a fluid pump, means controlling the operation of said pump comprising a shift rod movable longitudinally of itself between a pump operating position and a pump inoperative position through a neutral zone, a compressed air operated throttle stop, a valve controlling supply of compressed air thereto, said controlling valve having a position to supply compressed air to said throttle stop and a position to discharge compressed air from said throttle stop to the atmosphere, a cam, means rigidly connecting said cam to said shift rod to move as a unit therewith in a path parallel thereto, and a follower mounted on said controlling valve engaging said cam to determine the position of said controlling valve, said controlling valve being in one of said positions during engagement of said follower with the low portion of said cam and in the other of said positions during engagement of said follower with the high portion of said cam, said cam having a gradually inclined portion connecting said low and high portions engaged by said follower during movement of said shift rod through said neutral zone.

4. In apparatus for transporting a fluid, a fluid pump, means controlling the operation of said pump comprising a shift rod movable longitudinally of itself between a pump operating position and a pump inoperative position through a neutral zone, a compressed air operated emergency valve, a valve controlling supply of compressed air thereto, said controlling valve having a position to supply compressed air to said emergency valve and a position to discharge compressed air from said emergency valve to the atmosphere, a cam, means rigidly connecting said cam to said shift rod to move as a unit therewith in a path parallel thereto, and a follower mounted on said controlling valve engaging said cam to determine the position of said controlling valve, said controlling valve being in one of said positions during engagement of said follower with the low portion of said cam and in the other of said positions during engagement of said follower with the high portion of said cam, said cam having a gradually inclined portion connecting said low and high portions engaged by said follower during movement of said shift rod through said neutral zone.

5. The combination with a pump and means controlling operation of said pump comprising a shift rod, of a cam, means rigidly connecting said cam and said shift rod to move in the same direction as a unit, and a valve having a movable valve member provided with a follower engaging said cam, said cam having a low portion, a high portion and an inclined planar portion extending between said low and high portions.

6. The combination with a pump and means controlling operation of said pump comprising a shift rod, of a cam, mounted for movement parallel to said shift rod, means rigidly connecting said cam and said shift rod to move in the same direction as a unit, and a valve having a movable valve member provided with a follower engaging said cam, said cam having a planar low portion, a planar high portion parallel to said low portion and an inclined planar portion extending between said low and high portions.

7. The combination with a pump and means controlling operation of said pump comprising a shift rod, of an L-shaped arm rigidly mounted on said shift rod to move therewith, said arm having a portion extending transversely of said rod and a portion extending parallel to said rod, a cam rigidly mounted on said last mentioned portion and extending longitudinally thereof, and a valve having a movable valve member provided with a follower engaging said cam, said cam having a low portion, a high portion and an inclined planar portion extending between said low and high portions.

8. In apparatus for transporting a fluid, a fluid pump, means controlling the operation of said pump comprising a shift rod movable between alternate positions, a brake line, a valve controlling supply of compressed air to said brake line, and means for controlling the position of said controlling valve comprising a controlling member actuated by said shift rod and having alternate positions determined by said shift rod and corresponding to the positions of said shift rod.

9. In apparatus for transporting a fluid, a fluid pump, means controlling the operation of said pump comprising a shift rod movable between alternate positions, a throttle stop, a controlling element therefor, and means for controlling the position of said controlling element comprising a controlling member actuated by said shift rod and having alternate positions determined by said shift rod and corresponding to the positions of said shift rod, and a valve having alternate positions corresponding to the positions of said controlling member.

10. In apparatus for transporting a fluid, a fluid pump, means controlling the operation of said pump comprising a shift rod movable between alternate positions, an emergency valve, a throttle stop, a controlling element therefor, and means for controlling the position of said controlling element comprising a controlling member actuated by said shift rod and having alternate positions determined by said shift rod and corresponding to the position of said shift rod, and a valve having alternate positions corresponding to the position of said controlling member.

11. In apparatus for transporting a fluid, a fluid pump, means controlling the operation of said pump comprising a shift rod movable between alternate positions, a compressed air operated throttle stop, a compressed air operated emergency valve, a brake line, a valve controlling supply of compressed air to said brake line, throttle stop operating means and emergency valve operating means, and means for controlling the position of said controlling valve comprising a controlling member actuated by said shift rod and having alternate positions determined by said shift rod and corresponding to the positions of said shift rod.

12. In apparatus for transporting a fluid, a fluid pump, means controlling the operation of said pump comprising a shift rod longitudinally movable between two alternate positions, a brake controlling element, a cam mounted for movement in a path parallel to said shift rod controlling the position of said brake controlling element, and a rigid connection between said cam and shift rod to move said rod and cam as a unit.

References Cited in the file of this patent

UNITED STATES PATENTS

| | | |
|---|---|---|
| 321,197 | Edwards et al. | June 30, 1885 |
| 2,002,757 | Shand | May 28, 1935 |
| 2,663,459 | Lagrange et al. | Dec. 22, 1953 |
| 2,707,577 | Trotter et al. | May 3, 1955 |
| 2,847,023 | Hansen et al. | Aug. 12, 1958 |
| 2,871,872 | Rowles | Feb. 3, 1959 |
| 2,924,423 | Weiser et al. | Feb. 9, 1960 |